May 22, 1956
H. L. MATTHEWS
2,746,554
PARKING DEVICE FOR VEHICLES
Filed Oct. 15, 1952
4 Sheets-Sheet 1
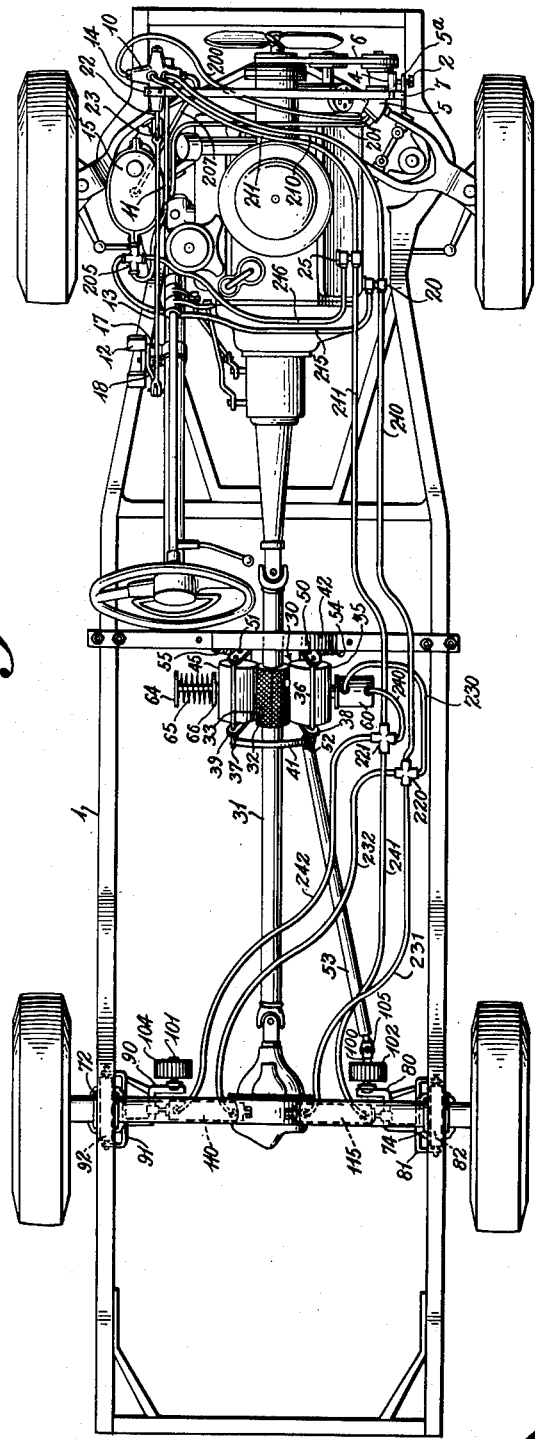
INVENTOR.
Harry L. Matthews
BY *Charles M. Thomas*
ATTORNEY May 22, 1956
H. L. MATTHEWS
2,746,554
PARKING DEVICE FOR VEHICLES
Filed Oct. 15, 1952
4 Sheets-Sheet 2
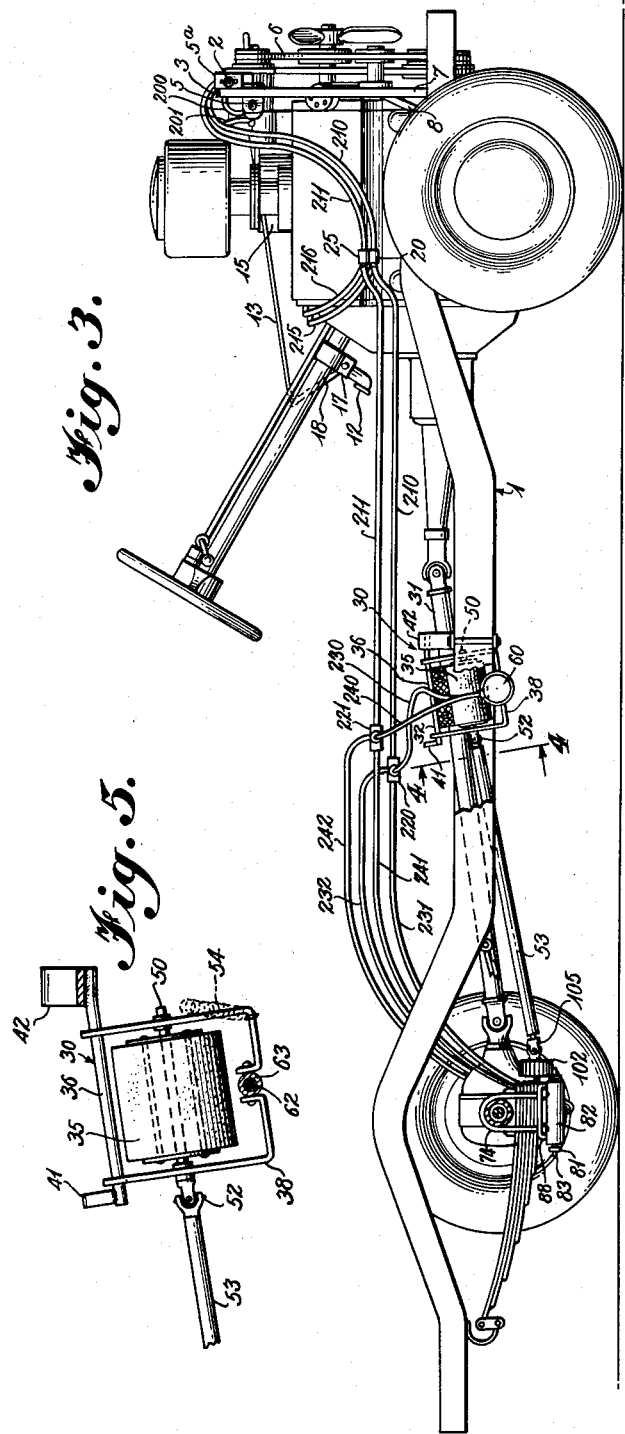
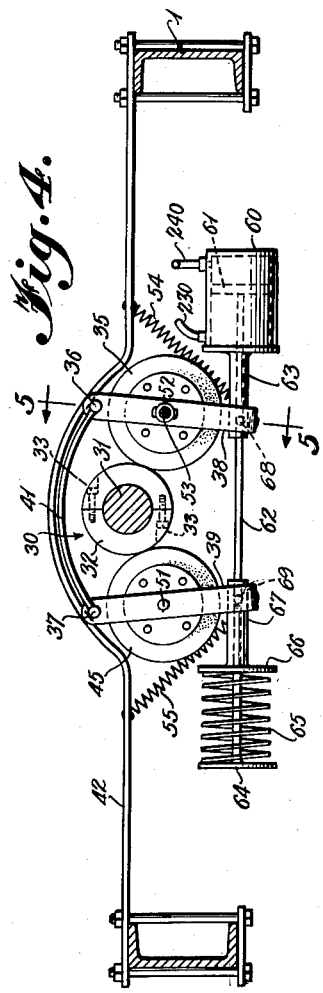
INVENTOR
Harry L. Matthews
BY Charles M. Thomas
ATTORNEY May 22, 1956

H. L. MATTHEWS 2,746,554

PARKING DEVICE FOR VEHICLES

Filed Oct. 15, 1952

INVENTOR
Harry L. Matthews

BY Charles N. Thomas
ATTORNEY

May 22, 1956 — H. L. MATTHEWS — 2,746,554
PARKING DEVICE FOR VEHICLES
Filed Oct. 15, 1952 — 4 Sheets-Sheet 4
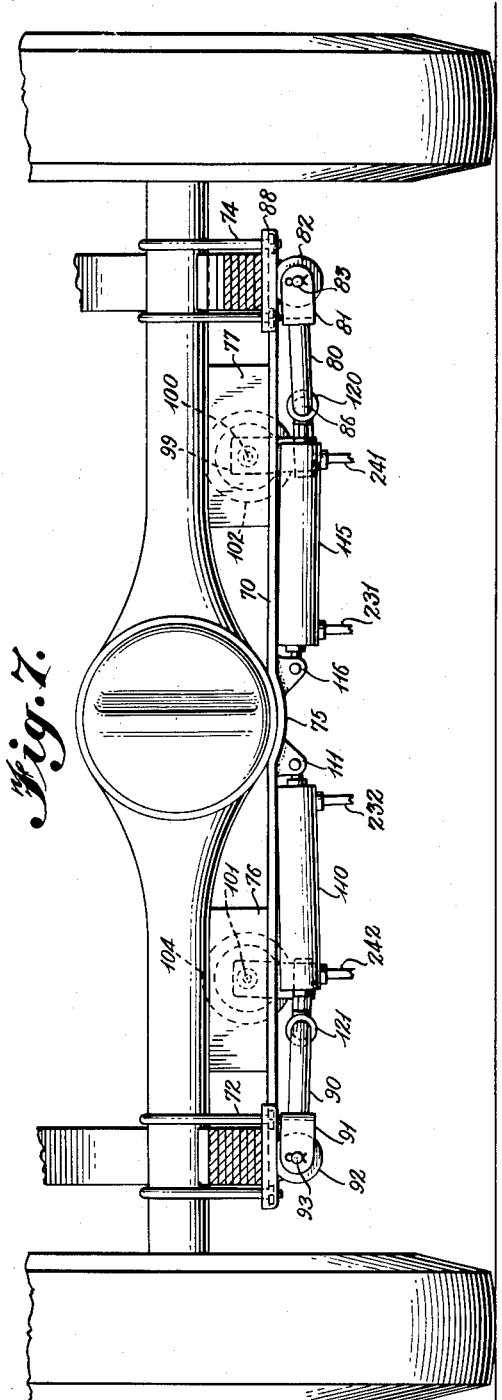
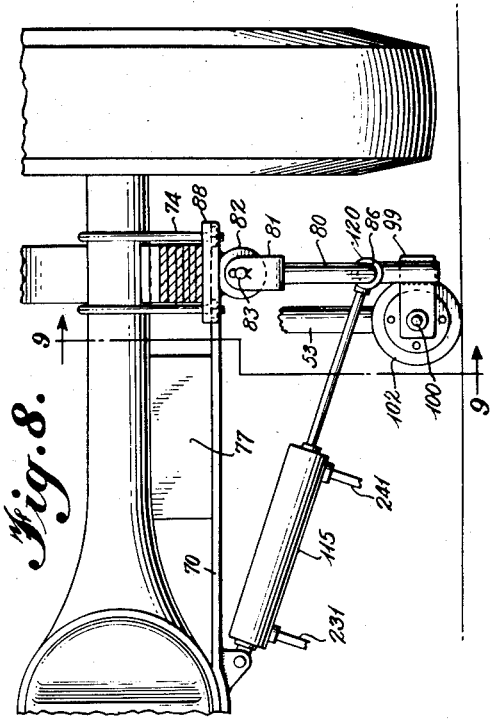
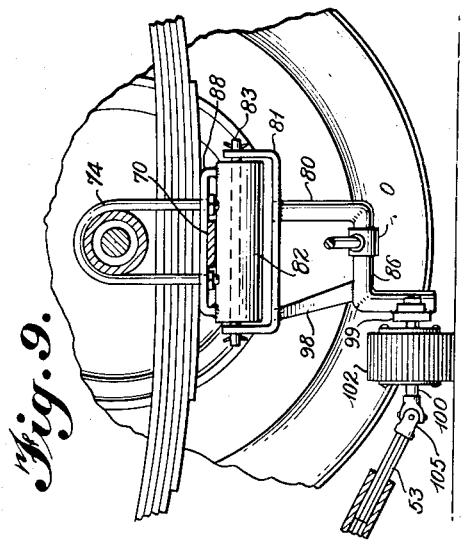
INVENTOR
Harry L. Matthews
BY Charles R. Thomas
ATTORNEY

United States Patent Office

2,746,554
Patented May 22, 1956

2,746,554

PARKING DEVICE FOR VEHICLES

Harry L. Matthews, Seattle, Wash., assignor of one-half to John C. Hurley, Seattle, Wash.

Application October 15, 1952, Serial No. 314,937

4 Claims. (Cl. 180—1)

This invention relates to an attachment for automobiles, trucks, busses, etc., and it more particularly is directed to an apparatus for quick and accurate parking or turning of the same in confined spaces.

The invention may be broadly described as one wherein an auxiliary pair of wheels, positioned right-angularly to the longitudinal axis of the vehicle, may be raised and lowered when desired to lift the rear end of the vehicle off the ground and move it sideways into a confined parking space. A major portion of the apparatus is powered by hydraulic mechanism; the wheels for moving the vehicle laterally, when in an extended position, being powered directly off the drive shaft of the car by a flexible drive shaft. A primary feature of the arrangement herein shown and described is its ease of manipulation; a single foot pedal is employed for raising and lowering the wheels which propel the car into a parking space, and the gear shift is used to motivate these wheels. The hydraulic mechanism for control of the friction drive which powers such wheels and the hydraulic equipment for raising and lowering the same is the essence of simplicity in method of attachment and operation.

Mechanisms have been heretofore devised for accomplishing this same end objective; however, the instant invention has as its primary object the provision of a parking device as an attachment, which is the essence of simplicity, has but few component parts, and is capable of mass production at a minimum of cost.

An additional object of this invention is the provision of a mechanism of the described type that is readily adaptable to any type or make of vehicle and which can be installed quickly and easily without the services of an experienced mechanic.

A further object of this invention is to provide an apparatus of the described nature which is easily controlled by the operator of the vehicle without the addition of a great number of complex control elements and which enables a vehicle to be turned in a complete circle in either direction thereby enabling reversing direction of a vehicle or reversing of position of a vehicle in a limited amount of space.

Actual experiments with the device of this invention have shown that in the preferred embodiment thereof an automobile, when so provided with the device, can be parked in a minimum amount of space in approximately ten seconds, the operation being timed from the moment the front of the car is placed in position until parking thereof is completed.

In the following more particular description of the invention, reference is made to the appended drawings, wherein:

Figure 1 is a plan view of the invention as attached to an automobile of any conventional type;

Figure 2 is a diagrammatic view indicating the method by which the use of this invention enables parking of a vehicle in a confined or limited space;

Figure 3 is a side elevation view, partly in section, showing the invention depicted in Figure 1;

Figure 4 is a section view taken on the line 4—4 of Figure 3;

Figure 5 is a section view taken on the line 5—5 of Figure 4;

Figure 7 is an elevation view taken from the rear of the vehicle indicating the manner in which the hydraulic pistons for lifting the wheels of the attachment are secured to the vehicle;

Figure 8 is an elevation view taken from the rear of the vehicle showing one of the parking wheels in lowered position; and Figure 9 is a section view taken on the line 9—9 of Figure 8.

Front end assembly

Figure 6:
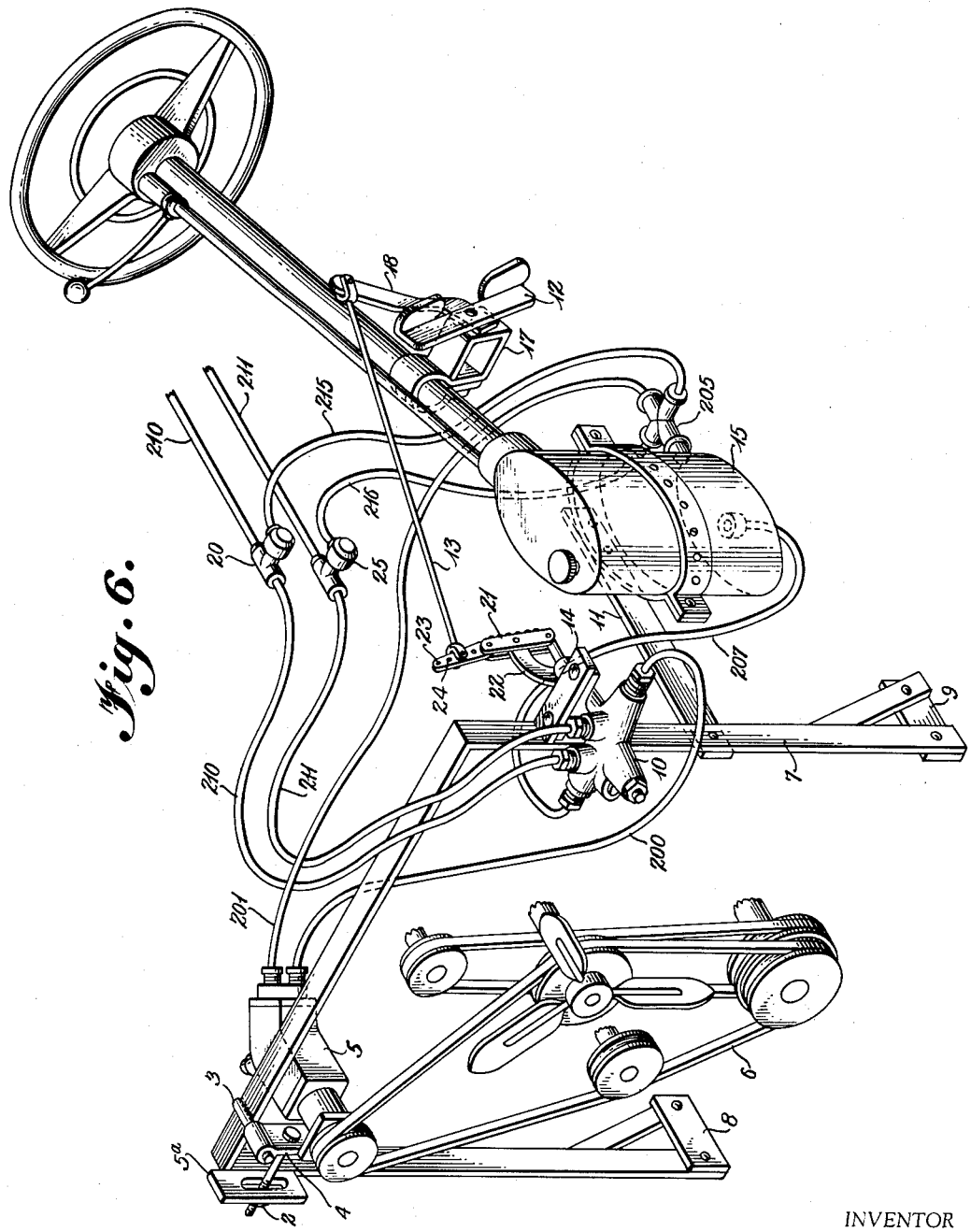
Figure 6 is a perspective view indicating the manner of interconnection of the several hydraulic elements.

Referring more particularly to the foregoing, it is seen that the frame of the vehicle is indicated generally at 1. Mounted on the forepart of the frame adjacent to the vehicle engine are several of the hydraulic elements for motivation of the device. A fluid pump 5 is, of course, necessary to provide sufficient hydraulic pressure for operation of both the friction drive and the hydraulic pistons which raise and lower the wheels. This pump may be driven off the fan belt or, as here indicated, the belt 6 which may drive either the timer or water pump of the vehicle. This fluid pump 5 can be of any known commercial type provided it is of sufficient capacity to provide fluid pressure necessary for operative purposes. This pump, as are related items of the hydraulic system, is mounted upon a rectangular framework 7. The lower extremities of the latter comprise supports 8 and 9 which can be affixed transversely to the frame of the vehicle. Frame 7 is, of course, erected perpendicularly to the frame and of sufficient size so that the various hydraulic elements mounted thereon are conveniently accessible but not unnecessarily close to any moving parts of the engine.

The aforesaid pump 5 is secured to a bracket 4 which is preferably adjustable with respect to framework 7 in such manner that the proper amount of tension can be placed upon belt 6. As shown in Figure 6, adjustability is obtained by swiveling the bracket 4 on a pin 3 welded to the frame 7. Slack in belt 6 is taken up by tightening the nut of a bolt 2 which passes through the bracket on one end and through a slot in an appropriate plate 5a, the latter also being suitably secured to frame 7.

Upon one side of this framework 7 and opposite the aforesaid pump 5 is a fluid selector valve 10. Such valves are also known to the art and the one herein used may be of any suitable type. As herein shown the valve is of a four-way type. For mounting this valve a right angular extension 14 is affixed to the upper part of the frame 7 and the valve secured thereto in a manner shown in Figure 6. The selector valve should be mounted with the outlet and inlet uppermost in the manner depicted in this figure for convenience in leading the pressure lines rearwardly to the one driven wheel and to the hydraulic cylinder which controls the friction drive.

The frame 7, on the side adjacent to such selector valve is provided with an extension, or horizontal bar, 11 and to this is affixed a conventional hydraulic sump or a hydraulic reservoir 15.

The selector valve is controlled by a foot pedal 12 which is simply a rocker arm mounted on a pivot so that in one position fluid from the selector valve is directed in one way and in the opposite position of the pedal fluid is forced in the opposite direction. The rocker arm or foot pedal 12 is interconnected through a pivoted linkage 18 to a control rod 13 which in turn is secured directly or through an additional pivoted linkage to the actuator arm of the selector valve.

As herein shown the foot pedal is pivoted upon a bracket 17 and the latter is secured in any adjustable manner to the steering column. The referred to control rod 13 is pivoted to an element 23 and the latter interconnected with a pivot 21. This pivot is supported on a bracket 22 and is also pivotally connected to the control rod of the selector valve 10. It will be noted that the element 23 is provided with several apertures 24 in order that the position of the rod 13 can be adjusted for optimum performance.

As is usual in hydraulic systems of this general type it is necessary to interpose in the circuit pressure relief valves in order that when the device is not in use pressure in the system is released from the pump to the reservoir and continually recycled without a build up of pressure that would damage any of the components of the system. Such pressure relief valves are indicated at 20 and 25, one being located in each of the lines leading from the selector valve.

Friction drive assembly

As stated, the auxiliary wheels used for lateral movement to park the vehicle are powered directly off the drive shaft of the vehicle. In most cases, and unless there is a torque tube surrounding the drive shaft, the latter is open as shown herein.

The friction drive 30 of the invention is more particularly illustrated in Figure 4. As there shown the main drive shaft 31 of the vehicle is fitted with a main friction drive wheel or collar 32. This collar, fabricated of cast iron, is split in the center for ease of assembly. There is a studded bolt 33 through each half of the collar with a threaded complementary section in the opposite half, the bolt heads being mounted on opposite sides for balance. The exterior surface of this main friction drive wheel 32 is ribbed or corrugated to give it a rough surface for tractive purposes against the friction drive wheel 35. The counterpart to the latter is an idling friction drive wheel 45, used to balance or equalize the pressure on the main friction drive wheel 32 when its opposed drive wheel 35 is forced against the surface of the collar 32. These two friction wheels, drive 35 and idler 45, are hingedly mounted in a similar manner. Specifically, two rearwardly extending pins or rods 36 and 37 are fitted into appropriate apertures in the cross brace 42 of the main frame and securely welded thereto. Such rods are interconnected at their rearward extremities by an interconnecting brace 41. These two rods afford support for two hinge bars 38 and 39. The latter are U shaped in configuration as seen in Figure 3 and the upper ends of each of them are apertured to receive the two support rods 36 and 37. It is thus seen that the referred to hinge bars, so mounted, are swiveled on these support rods in order that the drive wheels 35 and 45 mounted respectively in each one of them may be swiveled either to an inoperative position to each side of the main friction drive wheel 32 or to a position where they are pressed firmly against the surface of the friction drive, such as shown in Figure 4.

The two wheels, friction drive 35, and idler 45, are mounted upon two comparable axes 50 and 51, the latter being positioned approximately in the center of the two hinge bars in a manner clearly shown in Figures 3 and 4. The friction drive wheel 35 is firmly affixed to its axis 50 whereas the idler may be rotatably mounted upon its respective axis. The axis 50 is attached to a coupling 52 engaging any known type of flexible drive shaft 53, so that upon rotation of drive wheel 35 said flexible shaft is driven in the same direction.

The two friction wheels 35 and 45 are normally held apart by two springs 54 and 55 each of which is connected to the lower corner of one of the hinge bars.

These hinge bars are also engaged with a hydraulic cylinder or ram in the following manner. Such a cylinder is shown at 60. It is provided with the usual piston 61 and an extended piston rod 62. The cylinder casing is fitted with a pipe 63 having an internal diameter which may be appreciably larger than the diameter of the said piston rod. At its opposite end the piston rod is secured by welding in any suitable manner to a plate 64 engaging one end of a helical tension spring 65. The latter bears upon an opposing plate 66 and this latter plate also is provided with a pipe 67 extending inwardly or toward the opposing cylinder 60. It may also have an appreciably larger internal diameter than the piston rod 62.

These two pipes 63 and 67 are pivoted to the bottom of the hinge bars as indicated in Figure 4. If such piping is of the size that the tolerance between the internal diameter thereof and the piston rod is relatively small the piping 63 and 67 may be hinged or pivoted as by pivot pins 68, 69 to the hinge bars in any suitable manner so that reciprocation of the piston rod and pivoting of the two hinge bars will not have a binding effect during actuation of the piston.

The operation of the foregoing is as follows: When in the position shown in dotted line in Figure 4, the piston 61 is retracted considerably into the cylinder casing. Such action follows depression of the control pedal 12 in the desired direction. When this occurs the spring 65 is brought to bear upon plate 66 and the hydraulic cylinder and opposing plate 64 are forced together. This forces the two hinge bars towards each other with the result that the two friction wheels 35 and 45, mounted in such hinge bars, are brought to bear with considerable pressure upon the main drive wheel 32. Its rotation consequently causes rotation of the main drive wheel 35 and the latter transmits its rotary motion through the flexible drive shaft 53 to one of the transverse parking wheels, to be hereinafter described.

Rear end jack and drive assembly

Referring to Figures 7 to 9 inclusive it is seen that use is made of two wheels mounted underneath the axle of the vehicle. The structure supporting these two wheels is largely the same on both sides of the vehicle. This mounting is accomplished by securing a transverse plate or cross member 70 underneath the axle by means of U bolts 72 and 74 or any other expedient suitable for the purpose. The ends of these U bolts are threaded and secured in an obvious manner to the ends of the transverse plate 70, the ends being enlarged an appropriate amount for reception of this attachment. Near its center the cross member 70 is dished or curved as at 75 to receive the bottom of the differential casing of the vehicle. Also, if desirable, two blocks 76 and 77 may be positioned on either side of the differential and between plate 70 and the rear axle for additional rigidity of the device after attachment.

Two comparatively small wheels 102 and 104, which enable sideways or transverse movement of the vehicle, are mounted in such a manner that they can be raised and lowered at the will of the operator. This is accomplished by the provision of two pivoted brackets 80 and 90. These are pivoted to similar journals 82 and 92 on each side of the assembly and located immediately underneath the U bolts hereinbefore referred to. Such journals are machined flat on top to provide a greater welding surface and are welded to the bottom plate 88 which supports the leaf springs. Referring particularly to Figure 9 it is seen that the referred to brackets 80 and 90 are each provided with rectangular arms 81 and 91. These are apertured at their upper ends to receive pivot pins such as shown at 83 and 93 and the latter retained in the aforesaid journals by cotterpins or other suitable means. The brackets 80 and 90 are each formed with a piston support rod 86 and at the lower end of each of the brackets is fastened, as by welding, a wheel support extension 99. Support rod 86 is additionally strengthened by bracket 98. Such extension 99 is provided with shafts 100, 101 upon which the auxiliary wheels 102, 104 are mounted. In the case of wheel 104 it will be noted that this wheel is not driven and hence can be mounted on such shaft for free rotation. It is provided to balance the car horizontally when suspended above ground level in an obvious manner. Although as stated and as here shown only wheel 102 is driven. Similar drive apparatus can be utilized to drive wheel 104 also. Thus, a flexible shaft can be connected to the friction idler 45 and power similarly applied to wheel 104.

The other transverse wheel 102 is herein shown as being driven and accordingly, is affixed to the shaft 100 which in turn may be rotatably secured to the support bar 99. This shaft 100 engages the flexible drive 53 through any well known type of universal coupling 105.

The two wheels are simultaneously moved downwardly for operation, as well as retracted into an inoperative position, by two hydraulic cylinders 110 and 115. These cylinders are pivoted upon two lugs 111 and 116 secured to the cross member 70. At their opposite ends the piston rods of these cylinders are pivoted also to the frames 80 and 90 in the manner shown in Figures 8 and 9. In this embodiment of the invention the latter pivoting movement is obtained by securing the actuator rod of each cylinder to collars 120 and 121 respectively, the latter being free to rotate on the horizontal piston support rods 86 of the brackets 80 and 81.

By the use of hydraulic cylinders in the manner described tremendous force can be applied in an angular direction to each of the wheel supports to drive them downwardly and outwardly until they reach the vertical position shown in Figures 8 and 9. Such motion, of course, jacks the rear of the vehicle upwardly. Some form of locking media may be incorporated in the mounting of these supports 80 and 90 to prevent them from going past the point of absolute vertical, although the arrangement may be such that the piston rods of the hydraulic cylinders 110 and 115, when extended as shown in Figure 8, provide this locking force. The length of the supports and size of the wheels and related apparatus is such that when in this position the rear wheels of the vehicle are lifted substantially off the surface for ease of movement laterally.

*The hydraulic system*

Reference has been generally made to the hydraulic system, particularly with reference to location of the pump, selector valve and sump or reservoir. By reference to Figure 6 the manner of interconnecting these several elements as well as the friction drive apparatus and the controls for raising and lowering the wheels, will be readily apparent. The pump is connected by a line 200 to the selector valve 10 and receives fluid from the reservoir through line 201. The sump is connected at its opposite side by a line 207 to the opposite side of the selector valve.

Pressure lines to and from the selector valve are represented at 210 and 211. Intermediate these two lines are transposed two pressure relief valves 20 and 25 heretofore referred to. These, as illustrated in Figure 6, are also connected by lines 215 and 216 to the sump through a three-way connection 205.

The purpose of the pressure relief valves should be well known to those skilled in the art. When the system is not being used pressure, due to continuous action of the hydraulic pump, would build up to an undesirable high degree during operation of the vehicle unless some form of pressure release is provided. To limit the extent to which pressure will be applied to the system such relief valves are incorporated therein. They are set to bleed off hydraulic fluid from the lines 210 and 211 after it reaches a certain predetermined pressure point. They are, however, also set at a point that will assure their closure at pressures sufficient to operate the friction drive mechanism and the hydraulic cylinders which raise and lower the transverse wheels.

These two hydraulic lines 210 and 211 lead rearwardly to two four-way connections 220 and 221 respectively. These four-way connections are in turn interconnected with the hydraulic cylinders for the raising and lowering of the wheels and also the control for the friction drive wheel. Thus, the four-way connection 220 has one line 231 leading to one side of the right hand cylinder 115, an additional line 232 leading to one side of the left hand hydraulic cylinder 110 and a third line 230 leading to one side of the hydraulic cylinder 60 controlling the friction drive. Similarly the four-way lead 221, located on line 211, is provided with a line 241 leading to the opposite side of the right hand cylinder 115, a line 242 leading to the opposite side of left cylinder 110 and a line 240 leading to the opposite side of the friction drive cylinder 60.

It will be seen that when the selector valve is so moved as to admit pressure to 210 and return fluid through 211, that this hydraulic pressure is transmitted to the two hydraulic cylinders 110, 115 controlling the wheels resulting in an extension thereof and a lowering of the wheels. At the same time the piston of the hydraulic cylinder 60 is retracted thereby forcing the idler and friction wheels together. This places the friction drive wheel 35 in operative position to transmit rotation to the right hand transverse wheel 102 as soon as the gear shift of the vehicle is engaged.

During the forcing of the respective cylinders in the stated direction for actuation of this mechanism, the selector valve has opened line 211 to receive fluid on its return journey to the reservoir.

It is obvious that an opposite manipulation of the selector valve by foot pedal 12 results in a reverse flow of hydraulic fluid through line 211 and back through line 210 in such manner that the operation of the hydraulic cylinders is reversed. This results in retraction of the two wheels 102 and 104 to inoperative position and also the separation of friction drive wheel 35 and idler 45 to an inoperative position.

*Operation*

From the foregoing description of this invention the operation thereof should be apparent. Briefly, and referring firstly to Figure 2, it is seen that in using this device a vehicle is driven into a parking place with the front wheels adjacent the curb and immediately behind the automobile in front. As shown in Figure 2 the two cars, A and B, are spaced apart and the car being parked is designated C.

With the vehicle C in the position shown depression of foot pedal 12 causes actuation of the two rear cylinders 110 and 115 so that the two transverse drive wheels are driven downwardly to a vertical position. By the same motion the idler 45 and its counterpart friction drive wheel 35 are pivoted toward each other to a position where both are forced against the traction surface of the main friction drive wheel 32.

The automobile is now riding upon the two small transverse wheels with the rear wheels of the vehicle suspended an appreciable distance above the surface of the road.

The transmission is, during the procedure thus far, in neutral position. The operator then simply places the gear shift of the vehicle in low or reverse to cause the main drive shaft to rotate thereby rotating the right transverse drive wheel 102. In parking the vehicle the gear shift is, of course, placed in that position which will cause rotation of the right transverse drive wheel, when looking from rear to front, in a clockwise direction. The rotation of the latter causes lateral movement of the whole rear of the automobile adjacent the curb and into the parking place between vehicles A and B.

It is obvious that in removing the vehicle from the confined space that the transverse wheels must be in lowered position and that the transmission be engaged in a reverse direction to cause wheel 102 to rotate in an opposite or counterclockwise direction viewing the assembly from the rear forwardly.

When the rear of the vehicle C has been propelled to the position from which it initially started by such reverse rotation of wheel 102, the foot pedal 12 is depressed in the opposite direction. This causes reversal of fluid through the main pressure lines 210 and 211, in a manner heretofore described. The friction drive wheel 35 accordingly becomes disengaged, and the transverse parking wheels 102 and 104 are retracted by their respective hydraulic cylinders to the out of the way position shown in Figure 7. Thus, by simple manipulation of only foot pedal 12 and the gear shift of the vehicle, the entire parking operation is accomplished in but a few seconds.

It is believed that this invention is more practical and far more efficient than the many and varied prior efforts seeking to obtain a like result. The combination herein described is less complex than any heretofore known, primarily from the standpoint of assembly thereof, adaptability to vehicles of various types and ease of manipulation by the operator.

Although the instant invention has been described with respect to a preferred embodiment thereof, it is to be understood that alterations and variations may be made without departing from the spirit or scope of the invention as defined by the appended claims.

What is claimed is:

1. In combination with a vehicle having a motor, a frame and a main drive shaft, means for turning said vehicle in a confined space, said means including a hydraulic system and comprising a fluid pump driven by said motor, a selector valve, said selector valve being in hydraulic interconnection with said pump and having means to control the direction of fluid from said pump through said system, a friction drive adapted to contact said shaft, said friction drive including opposed friction wheels on each side of said shaft, hinge bars pivotally suspended from said frame on each side of said shaft, said friction wheels being mounted for rotation in said hinge bars, hydraulic ram means including relatively moving telescopic members, each of said telescopic members being pivotally interconnected with one of said hinge bars whereby said friction wheels may be selectively driven toward each other in driving contact with said shaft and away from each other out of contact with said shaft, said hydraulic ram means being in fluid interconnection with said selector valve, two supporting brackets pivoted to said frame, auxiliary wheels mounted for rotation on each of said brackets upon axes longitudinally disposed with respect to said frame, hydraulic cylinder means in interconnection with each of said brackets to lower said wheels to ground engaging contact and to raise said wheels to raised inoperative position, said cylinder means being pivotally interconnected with said frame at one end thereof and to said brackets at the other end thereof, said cylinder means being in interconnection with said selector valve, means in interconnection with said friction wheels and at least one of said auxiliary wheels to drive said auxiliary wheels, whereby in one position of said valve said wheels are lowered and said friction wheels simultaneously engage said drive shaft, and in another position said wheels are retracted and said friction wheels are simultaneously placed out of contact with said shaft.

2. In combination with a vehicle having a motor, a frame and a main drive shaft, means for turning said vehicle in a confined space, said means including a hydraulic system and comprising a fluid pump driven by said motor, a selector valve, said selector valve being in hydraulic interconnection with said pump and having means to control the direction of fluid to and from said pump through said system, a friction drive adapted to contact said shaft, said friction drive including opposed friction wheels on each side of said shaft, hinge bars pivotally suspended from said frame on each side of said shaft, said friction wheels being mounted for rotation in said hinge bars, hydraulic ram means including relatively moving telescopic members, each of said telescopic members being pivotally interconnected with one of said hinge bars whereby said friction wheels may be selectively driven toward each other in driving contact with said shaft and away from each other out of contact with said shaft, said hydraulic ram means being in fluid interconnection with said selector valve, two supporting brackets pivoted to said frame, auxiliary wheels mounted for rotation on each of said brackets, hydraulic cylinder means in interconnection with each of said brackets to lower said wheels to ground engaging contact and to raise said wheels to inoperative position, said auxiliary wheels being mounted upon axes longitudinally disposed with respect to said frame, said cylinder means being in interconnection with said selector valve, said cylinder means being pivotally interconnected with said frame at one end thereof and to said brackets at the other end thereof, said selector valve in one position directing fluid in one direction to retract said hydraulic ram means, said one position directing fluid to extend said hydraulic cylinder means, said selector valve in another position directing fluid to extend said hydraulic ram means and retract said hydraulic cylinder means and an operator's foot lever connected to said selector valve for selective disposition thereof in said two positions, means driven by said friction wheels and in interconnection with at least one of said auxiliary wheels to rotate at least one of said auxiliary wheels whereby in one position of said valve said auxiliary wheels are lowered and said friction wheels simultaneously engage said drive shaft, and in another position said auxiliary wheels are retracted and said friction wheels are simultaneously placed out of contact with said shaft.

3. In combination with a motor propelled vehicle having a motor, a frame and a main drive shaft, means for turning said vehicle in a confined space, said means including a hydraulic system and comprising a fluid pump driven by said motor, a selector valve, said selector valve being in hydraulic interconnection with said pump and having means to control the direction of fluid to and from said pump through said system, a friction drive adapted to contact said shaft, said friction drive including opposed friction wheels on each side of said shaft, hinge bars pivotally suspended from said frame on each side of said shaft, said friction wheels being mounted for rotation on said hinge bars, means to pivot said friction wheels toward each other in driving contact with said shaft and away from each other out of contact with said shaft, said pivoting means including a hydraulic ram having an extended piston rod and relatively moving telescopic members, each of said telescopic members being pivotally interconnected with one of said hinge bars, said piston rod terminating in a spring plate, a spring positioned to exert thrust against said plate and one of said friction wheels, said piston rod being in pivoted interconnection with both of said hinge bars, whereby upon retraction of said ram said friction wheels are brought to shaft-contacting position, said hydraulic ram means being in fluid interconnection with said selector valve, two supporting brackets, auxiliary wheels mounted for rotation on each of said brackets upon axes longitudinally disposed with respect to said frame, hydraulic cylinder means in interconnection with said brackets and said frame to lower said wheels to ground engaging contact and to raise said wheels to inoperative position, said cylinder means being in interconnection with said selector valve, a flexible shaft in interconnection with one of said friction wheels and driven thereby, said flexible shaft being in driving interconnection with one of said auxiliary wheels, whereby in one position of said valve said auxiliary wheels are lowered and said friction wheels simultaneously engage said drive shaft, and in another position said auxiliary wheels are retracted and said friction wheels are simultaneously placed out of contact with said shaft.

4. In combination with a vehicle having a motor, a frame, and a main drive shaft, means for turning said vehicle in a confined space, said means including a hydraulic system and comprising a fluid pump driven by said motor, a selector valve, said selector valve being in hydraulic interconnection with said pump and having means to control the direction of fluid from said pump through said system, a friction drive adapted to contact said shaft, said friction drive including opposed friction wheels on each side of said shaft, hinge bars pivotally suspended from said frame on each side of said shaft, said friction wheels being mounted for rotation in said hinge bars, means to pivot said friction wheels toward each other in driving contact with said shaft and away from each other out of contact with said shaft, said pivoting means including a hydraulic ram and relatively moving telescopic members comprising a piston rod in said ram, said piston rod terminating in a spring plate, a spring positioned about said rod to exert thrust against said plate, one of said telescopic members and one of said friction wheels, said piston rod being in pivoted interconnection with both of said hinge bars, whereby upon retraction of said ram said friction wheels are brought to shaft-contacting position, said hydraulic ram means being in fluid interconnection with said selector valve, two pivoted supporting brackets, auxiliary wheels mounted for rotation on longitudinal axis with respect to said frame on each of said brackets, hydraulic cylinder means in interconnection with said brackets to lower said wheels to ground engaging contact and to raise said wheels to inoperative position, said cylinder means being pivotally interconnected with said frame at one end thereof and to said brackets at the other end thereof, said cylinder means being in interconnection with said selector valve, said selector valve in one position directing fluid in one direction to retract said hydraulic ram means, said one position directing fluid to extend said hydraulic cylinder means, said selector valve in another position directing fluid to extend said hydraulic ram means and retract said hydraulic cylinder means and an operator's foot lever connected to said selector valve for selective disposition thereof in said two positions, means driven by said friction wheels and including an interconnection with at least one of auxiliary wheels to drive said one wheel whereby in one position of said valve said auxiliary wheels are lowered and said friction wheels simultaneously engage said drive shaft, and in another position said auxiliary wheels are retracted and said friction wheels are simultaneously placed out of contact with said shaft.

References Cited in the file of this patent
UNITED STATES PATENTS

| | | |
|---|---|---|
| Re. 18,904 | Walker | July 25, 1933 |
| 723,333 | Story | Mar. 24, 1903 |
| 1,420,307 | Delaney | June 20, 1922 |
| 1,639,054 | Palmer | Aug. 16, 1927 |
| 1,742,566 | Walker | Jan. 7, 1930 |